(12) United States Patent
Zhang et al.

(10) Patent No.: US 9,445,301 B2
(45) Date of Patent: Sep. 13, 2016

(54) METHOD, APPARATUS, AND SYSTEM FOR ACCESSING MULTI-OPERATOR CORE NETWORK

(71) Applicant: Huawei Technologies Co., Ltd., Shenzhen (CN)

(72) Inventors: Yanping Zhang, Shanghai (CN); Frank Mademann, Berlin (DE); Wenfu Wu, Shanghai (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 13/896,990

(22) Filed: May 17, 2013

(65) Prior Publication Data

US 2013/0250894 A1 Sep. 26, 2013

Related U.S. Application Data

(63) Continuation of application No. PCT/CN2010/078842, filed on Nov. 17, 2010.

(51) Int. Cl.
*H04W 4/00* (2009.01)
*H04W 28/02* (2009.01)
*H04W 48/18* (2009.01)

(52) U.S. Cl.
CPC ......... *H04W 28/0236* (2013.01); *H04W 48/18* (2013.01)

(58) Field of Classification Search
CPC .... H04W 72/04; H04W 88/08; H04W 76/00
See application file for complete search history.

(56) References Cited

U.S. PATENT DOCUMENTS

| 6,791,944 | B1* | 9/2004 | Demetrescu | H04L 1/0059 370/235 |
|---|---|---|---|---|
| 7,299,046 | B1* | 11/2007 | Ozugur | H04W 8/02 370/328 |
| 2005/0157673 | A1 | 7/2005 | Verma et al. | |
| 2005/0185619 | A1* | 8/2005 | Niemela et al. | 370/331 |
| 2005/0281216 | A1* | 12/2005 | Varonen | H04W 8/20 370/328 |
| 2008/0051088 | A1* | 2/2008 | Tariq et al. | 455/436 |
| 2008/0062930 | A1 | 3/2008 | Niemela et al. | |
| 2008/0181178 | A1* | 7/2008 | Shaheen | H04W 8/24 370/331 |
| 2008/0305768 | A1* | 12/2008 | Nylander | H04W 12/06 455/410 |

FOREIGN PATENT DOCUMENTS

| CN | 1659814 A | 8/2005 |
|---|---|---|
| CN | 101232729 A | 7/2008 |

(Continued)

OTHER PUBLICATIONS

3GPP TSG-GERAN WG2 Meeting #47bis, Oct. 19-22, 2010, G2-100326.*

(Continued)

*Primary Examiner* — Hassan Phillips
*Assistant Examiner* — Siren Wei
(74) *Attorney, Agent, or Firm* — Brinks Gilson & Lione

(57) ABSTRACT

Embodiments of the present invention relate to a method, an apparatus, and a system for accessing a multi-operator core network. The method includes: acquiring, by a second SGSN, an LLC parameter of a first SGSN from an access network device, where the LLC parameter of the first SGSN is sent by the first SGSN to the access network device; and interacting, by the second SGSN, with an MS by using the LLC parameter of the first SGSN.

17 Claims, 4 Drawing Sheets

(56) References Cited

FOREIGN PATENT DOCUMENTS

CN 101646166 A 2/2010
WO WO 2005/081550 A1 9/2005

OTHER PUBLICATIONS

3GPP TSG-GERAN WG2 Meeting #47bis G2-100326, Oct. 19-22, 2010, whole document.*

Alcatel-Lucent et al., "Support of MOCN by GERAN," 3GPP TSG-GERAN WG2 Meeting #47bis, Vienna Austria, Oct. 2010, G2-100326, 16 pages.
LTE, "$3^{rd}$ Generation Partnership Project; Technical Specification Group Services and System Aspects; Network Sharing; Architecture and Functional Description (Release 9)," 3GPP TS 23.251, V9.2.0, Mar. 2010, 20 pages.
TeliaSonera, "Redirection in a MOCN Shared Network," 3GPP TSG-SA2 Meeting #38, Atlanta, USA, Feb. 2004, S2-040730, 6 pages.

* cited by examiner

| Format (format) | Control Field Bits (control field bits) | | | | | | | | Octet (Octet) |
|---|---|---|---|---|---|---|---|---|---|
| | 8 | 7 | 6 | 5 | 4 | 3 | 2 | 1 | |
| I format (I format) (I+S) | 0 | A | X | N(S) | | | | | 1 |
| | N(S) | | | | X | N(R) | | | 2 |
| | N(R) | | | | | | S1 | S2 | 3 |
| S format (S format) | 1 | 0 | A | X | X | N(R) | | | 1 |
| | N(R) | | | | | | S1 | S2 | 2 |
| UI format (UI format) | 1 | 1 | 0 | X | X | N(U) | | | 1 |
| | N(U) | | | | | | 8 | 8 | 2 |
| U format (U format) | 1 | 1 | 1 | P/F | M4 | M3 | M2 | M1 | 1 |

FIG. 9

METHOD, APPARATUS, AND SYSTEM FOR ACCESSING MULTI-OPERATOR CORE NETWORK

CROSS-REFERENCE TO RELATED APPLICATIONS

This application is a continuation of International Application No. PCT/CN2010/078842, filed on Nov. 17, 2010, which is hereby incorporated by reference in their entireties.

FIELD OF THE INVENTION

Embodiments of the present invention relate to communications technologies, and in particular, to a method, an apparatus, and a system for accessing a multi-operator core network (Multi-Operator Core Network, MOCN for short).

BACKGROUND OF THE INVENTION

In a general packet radio service (General Packet Radio Service, GPRS for short) network, a terminal entity/mobile terminal (Terminal Entity/Mobile Terminal, TE/MT for short), that is, an MS, through a base station subsystem (Base Station Subsystem, BSS for short), can access a packet data network (Packet Data Network, PDN for short) through serving GPRS supporting nodes (Serving GPRS Supporting Node, SGSN for short) of multiple operators. This feature may be called a multi-operator core network (Multi-Operator Core Network, MOCN for short). The feature of the BSS may be called support of MOCN.

When the MS requests for accessing a network through the BSS, because the BSS cannot know which operator's SGSN can serve the MS, the BSS tries to send to each SGSN one by one an access request message from the MS. If an SGSN that receives the access request message judges that the MS cannot perform access, a reject cause and an access request reject message that includes the reject cause are returned to the BSS; and if the SGSN that receives the access request message judges that the MS can perform access, an access procedure of the MS is performed. When the BSS receives a reject cause and an access request reject message that includes the reject cause, where the reject cause and the access request reject message are sent by one SGSN, the BSS needs to redirect the access request message of the MS to another SGSN. Each message exchanged between the SGSN and the MS corresponds to one logical link control (Logical Link Control, LLC for short) parameter, for example, a sequence number used by an LLC layer. The MS can acquire the message and interact with the SGSN normally only when an LLC parameter corresponding to a message that is sent by the SGSN to the MS is consistent with an expected LLC parameter of the MS.

In the prior art, after the BSS redirects the access request message of the MS to another SGSN, the another SGSN needs to interact (for example, authenticate) with the MS. However, an LLC parameter corresponding to a message that is sent by the another SGSN to the MS may be inconsistent with an expected LLC parameter of the MS (that is, an LLC parameter expected by the MS according to an LLC parameter corresponding to a last message that is exchanged with a previous SGSN), so that the MS discards the message that is sent by the another SGSN to the MS, thereby affecting normal interaction between the another SGSN and the MS.

SUMMARY OF THE INVENTION

Embodiments of the present invention provide a method, an apparatus, and a system for accessing a multi-operator core network, so as to avoid a problem that an LLC parameter corresponding to a message that is sent by an SGSN to an MS is inconsistent with an expected LLC parameter of the MS so that the MS discards the message, thereby ensuring normal interaction between the MS and all SGSNs that are interconnected with a BSS.

An embodiment of the present invention provides a method for accessing a multi-operator core network, where the method includes:

acquiring, by a second SGSN, an LLC parameter of a first SGSN from an access network device, where the LLC parameter of the first SGSN is sent by the first SGSN to the access network device; and interacting, by the second SGSN, with an MS by using the LLC parameter of the first SGSN.

An embodiment of the present invention provides another method for accessing a multi-operator core network, where the method includes:

acquiring, by a second SGSN, an LLC parameter of a first SGSN from an access network device, where the LLC parameter of the first SGSN is sent by the first SGSN to the access network device;

adding, by the second SGSN, a preset parameter to the LLC parameter of the first SGSN to obtain an LLC parameter of the second SGSN; and interacting, by the second SGSN, with an MS by using the LLC parameter of the second SGSN.

An embodiment of the present invention further provides an apparatus for accessing a multi-operator core network, where the apparatus includes:

an acquiring module, configured to acquire an LLC parameter of a first SGSN from an access network device, where the LLC parameter of the first SGSN is sent by the first SGSN to the access network device; and an interaction module, configured to interact with an MS by using the LLC parameter of the first SGSN.

An embodiment of the present invention further provides another apparatus for accessing a multi-operator core network, where the apparatus includes:

an acquiring module, configured to acquire an LLC parameter of a first SGSN from an access network device, where the LLC parameter of the first SGSN is sent by the first SGSN to the access network device;

a processing module, configured to add a preset parameter to the LLC parameter of the first SGSN to obtain an LLC parameter of the second SGSN; and an interaction module, configured to interact with an MS by using the LLC parameter of the second SGSN.

An embodiment of the present invention further provides a system for accessing a multi-operator core network, where the system includes a first SGSN, an access network device, and a second SGSN, where the first SGSN is configured to send an LLC parameter of the first SGSN to the access network device;

the access network device is configured to acquire the LLC parameter of the first SGSN from the first SGSN, and send the LLC parameter of the first SGSN to the second SGSN; and the second SGSN is configured to acquire the LLC parameter of the first SGSN from the access network device, and interact with an MS by using the LLC parameter of the first SGSN.

An embodiment of the present invention further provides another system for accessing a multi-operator core network, where the system includes a first SGSN, an access network device, and a second SGSN, where the first SGSN is configured to send an LLC parameter of the first SGSN to the access network device;

the access network device is configured to acquire the LLC parameter of the first SGSN from the first SGSN, and send the LLC parameter of the first SGSN to the second SGSN; and the second SGSN is configured to acquire the LLC parameter of the first SGSN from the access network device, add a preset parameter to the LLC parameter of the first SGSN to obtain an LLC parameter of the second SGSN, and interact with an MS by using the LLC parameter of the second SGSN.

It can be known from the technical solutions that, in the embodiments of the present invention, a second SGSN acquires an LLC parameter of a first SGSN from an access network device, so that the second SGSN can interact with an MS by using the LLC parameter of the first SGSN; or a second SGSN acquires an LLC parameter of a first SGSN from an access network device, and the second SGSN adds a preset parameter to the LLC parameter of the first SGSN to obtain an LLC parameter of the second SGSN, so that the second SGSN can interact with an MS by using the LLC parameter of the second SGSN. In this way, a problem that an LLC parameter corresponding to a message that is sent by an SGSN to an MS is inconsistent with an expected LLC parameter of the MS so that the MS discards the message is avoided, thereby ensuring normal interaction between the MS and all SGSNs that are interconnected with an access network device.

BRIEF DESCRIPTION OF THE DRAWINGS

To illustrate the technical solutions in the embodiments of the present invention or in the prior art more clearly, the accompanying drawings required for describing the embodiments or the prior art are described briefly in the following. Apparently, the accompanying drawings in the following description merely show some embodiments of the present invention, and persons of ordinary skill in the art may also derive other drawings from these accompanying drawings without creative efforts.

FIG. 9 is a format diagram of a control field in an SGSN message in a method for accessing a network according to the second and fourth embodiments of the present invention.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
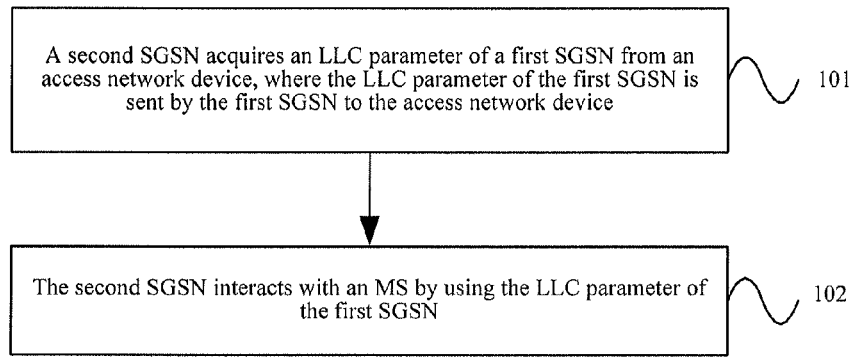
FIG. 1 is a schematic flow chart of a method for accessing a multi-operator core network according to a first embodiment of the present invention.

FIG. 1 is a schematic flow chart of a method for accessing a multi-operator core network according to a first embodiment of the present invention. As shown in FIG. 1, the method for accessing a multi-operator core network according to this embodiment may include the following steps.

Step 101: A second SGSN acquires an LLC parameter of a first SGSN from an access network device, where the LLC parameter of the first SGSN is sent by the first SGSN to the access network device.

The LLC parameter may include at least one of the following parameters: an LLC counter (counter), a sequence number (sequence number) used by an LLC layer, an unconfirmed sequence number (Unconfirmed sequence number, N(U)) used by the LLC layer, an unconfirmed send state variable (Unconfirmed send state variable, V(U)) used by the LLC layer, and another control field variable or parameter of the LLC layer, for example, a receive sequence number (Receive Sequence Number, N(R)).

Further, before this step, a step in which the first SGSN sends the LLC parameter of the first SGSN to the access network device may further be included. Specifically, the first SGSN may send a redirection message to the access network device, and the first SGSN may send the LLC parameter to the access network device; or the first SGSN may send a redirection message to the access network device, where the redirection message includes the LLC parameter of the first SGSN. Before the first SGSN sends the redirection message to the access network device, a step in which the first SGSN determines, according to subscription data or configuration data of an MS, to indicate redirection of the access network device may further be included. Specifically, the redirection message may be a message that includes a redirection indication and/or a reject cause, where the reject cause is not CS/PS coordination (CS/PS coordination).

The LLC parameter of the first SGSN may be an LLC parameter that is used during interaction between the first SGSN and the MS, or may be obtained by adding a preset parameter to an LLC parameter that is used during interaction between the first SGSN and the MS.

Step 102: The second SGSN interacts with an MS by using the LLC parameter of the first SGSN.

Specifically, the second SGSN may set a corresponding field of an LLC message packet that is sent to the MS as the LLC parameter of the first SGSN. The corresponding field of the LLC message packet may include an N(U) field of the LLC message packet.

In this embodiment, a second SGSN acquires an LLC parameter of a first SGSN from an access network device, so that the second SGSN can interact with an MS by using the LLC parameter of the first SGSN. In this way, a problem that an LLC parameter corresponding to a message that is sent by an SGSN to an MS is inconsistent with an expected LLC parameter of the MS so that the MS discards the message is avoided, thereby ensuring normal interaction between the MS and all SGSNs that are interconnected with an access network device. Moreover, because the LLC parameter used by the second SGSN is transferred from the first SGSN, it can be ensured that a parameter that has been used by the first SGSN is kept and is not used by the second SGSN again. When the access network device selects, according to a rule, to forward to the MS a message that is sent by the first SGSN, the MS does not discard the message, thereby ensuring that the MS acquires and processes a network side message timely and performs network selection correctly.

The access network device may include, but is not limited to, a base station subsystem (Base Station Subsystem, BSS for short) or a base station controller (Base Station Controller, BSC for short). Only a BSS is taken as an example for description in this embodiment of the present invention.

Figure 2:
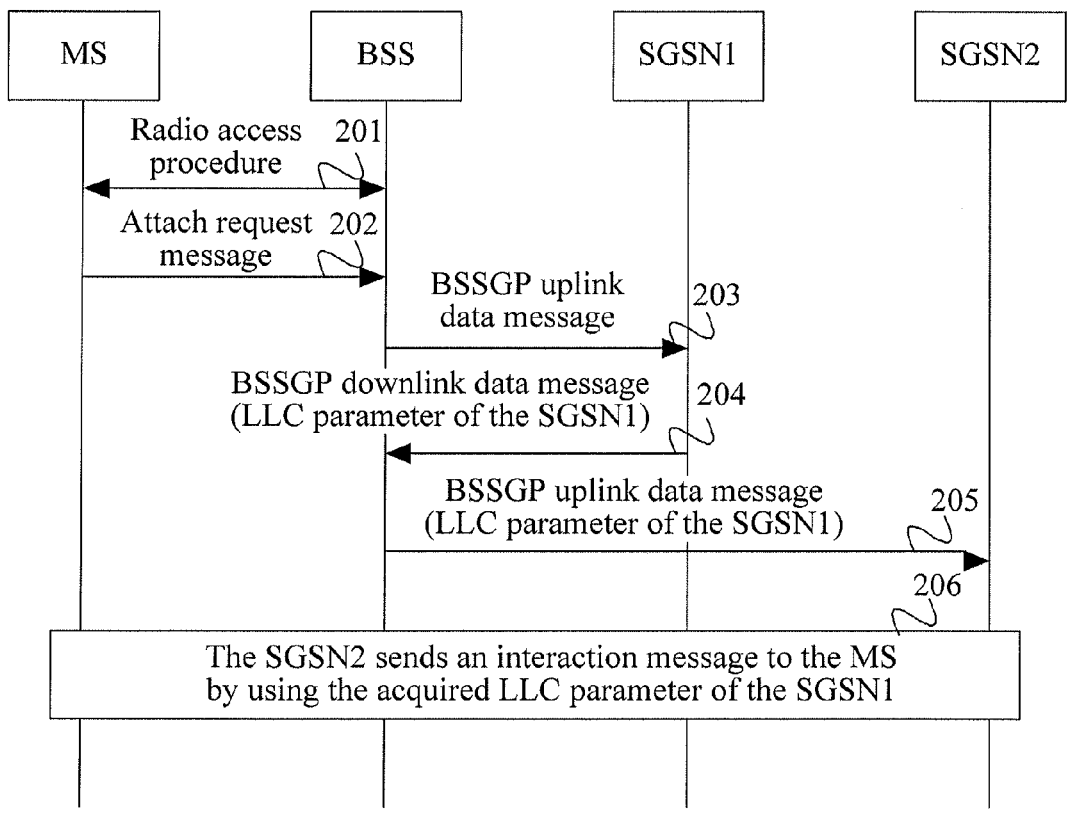
FIG. 2 is a schematic flow chart of a method for accessing a multi-operator core network according to a second embodiment of the present invention.

By taking an attach procedure as an example, FIG. 2 is a schematic flow chart of a method for accessing a multi-operator core network according to a second embodiment of the present invention. This embodiment is a specific embodiment of the foregoing embodiment. In this embodiment, a BSS is taken as an example of an access network device, and the BSS is interconnected with an SGSN1 of an operator 1 and an SGSN2 of an operator 2 separately. As shown in FIG. 2, the method for accessing a multi-operator core network according to this embodiment may include the following steps.

Step 201: An MS interacts with a BSS and performs a radio access procedure, and the BSS allocates a radio resource for the MS.

Step 202: The MS sends an attach request (Attach Request) message to the BSS.

Step 203: The BSS sends a base station subsystem GPRS protocol (Base Station Subsystem GPRS Protocol, BSSGP for short) uplink data (BSSGP UL-UNIDATA) message to an SGSN1, where the BSSGP uplink data message includes the attach request message and a redirection attempt flag (redirection attempt flag), and the redirection attempt flag may be used to indicate that the BSS supports MOCN.

Further, the BSS also needs to save information of the SGSN1 and record that the attach request message of the MS has already been sent to the SGSN1, so that the attach request message will not be sent to the SGSN1 again.

Step 204: The SGSN1 may acquire an international mobile subscriber identification number (International Mobile Subscriber Identification Number, IMSI for short) of the MS from the MS, or may also acquire the IMSI of the MS from an SGSN to which the MS was previously attached, acquire subscription data or configuration data of the MS (the configuration data includes, but is not limited to, a roaming protocol of an operator) according to the acquired IMSI of the MS, and judge that the MS cannot perform access or judge that the BSS needs to perform "CS/PS coordination", that is, determine to indicate redirection of the BSS, and send a BSSGP downlink data (BSSGP DL-UNIDATA) message to the BSS, where the BSSGP downlink data message includes an attach reject message, the IMSI of the MS, the attach request message, a redirection indication (redirection indication), a reject cause (reject cause), and an LLC parameter of the SGSN1.

The reject cause is a cause value for indicating redirection of the BSS, that is, a reject cause of the redirection. The reject cause may be included in a redirection indication information element, or may be an independent information element. In this embodiment of the present invention, the BSSGP downlink data message that includes the redirection indication and/or the reject cause is also called a redirection message.

Specifically, when the SGSN1 determines to indicate the redirection of the BSS, the SGSN1 sends a redirection message that includes an LLC parameter to the BBS. The LLC parameter may be included in an LLC message packet of the redirection message (the LLC message packet may further include an attach reject message), and the BSS reads the LLC parameter from the LLC message packet. In another manner, an LLC information element may be included in a redirection indication information element of the redirection message, and therefore, the BSS is not required to read the LLC information element from an LLC message packet. Definitely, the LLC parameter is also included in another independent information element or message packet of the redirection message, which is not limited herein. For example, the SGSN1 rejects access of the MS according to the subscription data or configuration data; the SGSN1 constructs an attach reject message and encapsulates the attach reject message in an LLC message packet, and sets LLC parameter information in the LLC message packet; and the SGSN1 includes the LLC message packet in a BSSGP downlink data packet and sends the BSSGP downlink data packet to the BSS; and the BSS reads an LLC parameter in the LLC message packet. In another manner, the SGSN1 may write an LLC parameter in a corresponding field in a redirection indication information element, and include an LLC message packet that includes an attach reject message and the redirection indication information element in BSSGP downlink data (that is, a redirection message), and send the BSSGP downlink data to the BSS; in addition, the SGSN1 may further include the LLC parameter, directly as an independent information element, together with an LLC message packet that includes an attach reject message, in a BSSGP downlink data packet (that is, a redirection message), and send the BSSGP downlink data packet to the BSS, and the BSS reads an LLC information element parameter in the data packet.

Optionally, the redirection message may also not include the LLC parameter of the SGSN1. Specifically, when the SGSN1 determines to indicate the redirection of the BSS, when sending a redirection message to the BBS, the SGSN1 uses another message to transfer the LLC parameter, for example, defines a new message to transfer the LLC parameter of the SGSN1. A redirection message and a message that includes the LLC parameter may be sent in any order, which is not limited in this embodiment.

Specifically, the SGSN1 may add a preset parameter increment (for example, 1) to an LLC parameter that is used during interaction between the SGSN1 and the MS, to obtain the LLC parameter of the SGSN1, so as to prevent the LLC parameter of the SGSN1 from being used by the SGSN1. For example, the SGSN1 adds a preset parameter, for example, 1, to an N(U) and sends the N(U) to the BSS; or the SGSN1 adds a preset parameter, for example, 1, to a V(U) and sends the V(U) to the BSS, so as to prevent the V(U) or N(U) from being used by the SGSN1; or the SGSN1 may also directly send the LLC parameter to the BSS, and specifically, the SGSN1 may send a V(U) to the BSS, where the V(U) was previously saved in the SGSN1.

Specifically, the SGSN1 may also identify a reject cause. If it is identified that the reject cause is not CS/PS coordination (CS/PS coordination), the SGSN1 sends the LLC parameter to the BSS; and if it is identified that the reject cause is CS/PS coordination (CS/PS coordination), the SGSN1 does not send the LLC parameter to the BSS, and performs a relevant procedure in the prior art, which is not repeated herein.

The LLC parameter of the SGSN1 may be included in the redirection indication, or may be an independent information element, which is not limited in this embodiment.

Step 205: The BSS acquires a reject cause of the SGSN1 and sends a BSSGP uplink data (BSSGP UL-UNIDATA) message to an SGSN2 according to the redirection indication, where the BSSGP uplink data message includes the attach request message, the redirection attempt flag (redirection attempt flag), the IMSI of the MS, and an acquired LLC parameter of the SGSN1, and the redirection attempt flag may be used to indicate that the BSS supports MOCN.

The LLC parameter of the SGSN1 may be included in the redirection attempt flag, or may be an independent information element, which is not limited in this embodiment.

Specifically, the BSS may further identify the acquired reject cause that is returned by the SGSN1. If it is identified that the reject cause is not CS/PS coordination (CS/PS coordination), the BSS sends BSSGP uplink data to the SGSN2; and if it is identified that the reject cause is CS/PS coordination (CS/PS coordination), the BSS does not send the BSSGP uplink data to the SGSN2, and performs a relevant procedure in the prior art, which is not repeated herein.

Step 206: The SGSN2 sends an interaction message to the MS by using the acquired LLC parameter of the SGSN1.

Specifically, the SGSN2 may write the acquired LLC parameter of the SGSN1 in a relevant field of an interaction LLC message packet, where the acquired LLC parameter of the SGSN1 is sent by the BSS, and send the interaction message to the MS. For example, the SGSN2 writes the acquired N(U) that is sent by the BSS in an N(U) field (field) shown in FIG. 9, or the SGSN2 writes the acquired V(U) that is sent by the BSS in the N(U) field (field) shown in FIG. 9. Detailed description is as follows:

A Acknowledgement request bit, acknowledgement request bit;

E Encryption function bit, encryption function bit;

Mn Unnumbered function bit, unnumbered function bit;

N(R) Transmitter receive sequence number, transmitter receive sequence number;

N(S) Transmitter send sequence number, transmitter send sequence number;

N(U) Transmitter unconfirmed sequence number, transmitter unconfirmed sequence number;

P/F Poll bit, when issued as a command, request bit;

Final bit, when issued as a response, final bit;

PM Protected mode bit, protected mode bit;

Sn Supervisory function bit, supervisory function bit; and

X Spare bit, spare bit.

In this step, the SGSN1 sends, to the SGSN2 through the BSS, the LLC parameter that is used during the interaction between the SGSN1 and the MS (that is, the LLC parameter of the SGSN1) or the LLC parameter of the SGSN1, where the LLC parameter of the SGSN1 is obtained by adding a preset parameter to the LLC parameter that is used during the interaction between the SGSN1 and the MS, so that when exchanging a message with the MS, the SGSN2 can write the acquired LLC parameter of the SGSN1 at a corresponding location in an LLC message packet (for example, an LLC message packet that includes an authentication message), thereby preventing the MS from discarding the message. Moreover, because the LLC parameter used by the SGSN2 is transferred from the SGSN1, it can be ensured that a parameter that has been used by the SGSN1 is kept and is not used by the SGSN2 again. When the access network device selects, according to a rule, to forward to the MS a message that is sent by the SGSN1, the MS does not discard the message, thereby ensuring that the MS acquires and processes a network side message timely and performs network selection correctly.

In addition, in the prior art, if all SGSNs that are interconnected with the BSS reject the access request of the MS, at this time, the BSS selects, according to a rule, a reject cause that is sent by a certain SGSN to the MS. If an LLC parameter of a message that is sent by the selected SGSN has been used by another SGSN, the MS discards the message that is sent by the selected SGSN, so that the MS fails to receive a message from a network side all the time, thereby causing that the MS keeps trying to access a network but fails to acquire a network service, and seriously affecting user experience. By adopting the method according to this embodiment of the present invention, a problem in the prior art that an LLC parameter of a message that is sent by a selected SGSN has been used by another SGSN does not occur, and it can be avoided that the MS discards the message that is sent by the selected SGSN.

Figure 3:
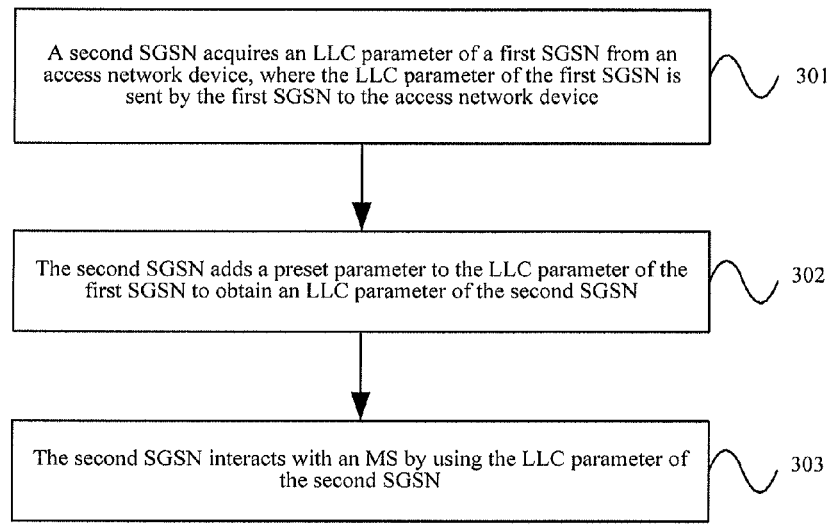
FIG. 3 is a schematic flow chart of another method for accessing a multi-operator core network according to a third embodiment of the present invention.

FIG. 3 is a schematic flow chart of another method for accessing a multi-operator core network according to a third embodiment of the present invention. As shown in FIG. 3, the method for accessing a multi-operator core network according to this embodiment may include the following steps.

Step 301: A second SGSN acquires an LLC parameter of a first SGSN from an access network device, where the LLC parameter of the first SGSN is sent by the first SGSN to the access network device.

The LLC parameter may include at least one of the following parameters: an LLC counter (counter), a sequence number (sequence number) used by an LLC layer, an unconfirmed sequence number (Unconfirmed sequence number, N(U)) used by the LLC layer, an unconfirmed send state variable (Unconfirmed send state variable, V(U)) used by the LLC layer, and another control field variable or parameter of the LLC layer, for example, a receive sequence number (Receive Sequence Number, N(R)).

Further, before this step, a step in which the first SGSN sends the LLC parameter of the first SGSN to the access network device may further be included. Specifically, the first SGSN may send a redirection message to the access network device, and the first SGSN may send the LLC parameter to the access network device; or the first SGSN may send a redirection message to the access network device, where the redirection message includes the LLC parameter of the first SGSN. Before the first SGSN sends the redirection message to the access network device, a step in which the first SGSN determines, according to subscription data or configuration data of an MS, to indicate redirection of the access network device may further be included. Specifically, the redirection message may be a message that includes a redirection indication and/or a reject cause, where the reject cause is not CS/PS coordination (CS/PS coordination).

The LLC parameter of the first SGSN may be an LLC parameter that is used during interaction between the first SGSN and the MS.

Step 302: The second SGSN adds a preset parameter to the LLC parameter of the first SGSN to obtain an LLC parameter of the second SGSN.

Step 303: The second SGSN interacts with an MS by using the LLC parameter of the second SGSN.

Specifically, the second SGSN may set a corresponding field of an LLC message packet that is sent to the MS as the LLC parameter of the second SGSN. The corresponding field of the LLC message packet may include an N(U) field of the LLC message packet.

In this embodiment, a second SGSN acquires an LLC parameter of a first SGSN from an access network device, and the second SGSN adds a preset parameter to the LLC parameter of the first SGSN to obtain an LLC parameter of the second SGSN, so that the second SGSN can interact with an MS by using the LLC parameter of the second SGSN. In this way, a problem that an LLC parameter corresponding to a message that is sent by an SGSN to an MS is inconsistent with an expected LLC parameter of the MS so that the MS discards the message is avoided, thereby ensuring normal interaction between the MS and all SGSNs that are interconnected with an access network device. Moreover, because the LLC parameter used by the second SGSN is transferred from the first SGSN, it can be ensured that a parameter that has been used by the first SGSN is kept and is not used by the second SGSN again. When the access network device selects, according to a rule, to forward to the MS a message that is sent by the first SGSN, the MS does not discard the message, thereby ensuring that the MS acquires and processes a network side message timely and performs network selection correctly.

The access network device may include, but is not limited to, a base station subsystem (Base Station Subsystem, BSS for short) or a base station controller (Base Station Controller, BSC for short). Only a BSS is taken as an example for description in this embodiment of the present invention.

Figure 4:
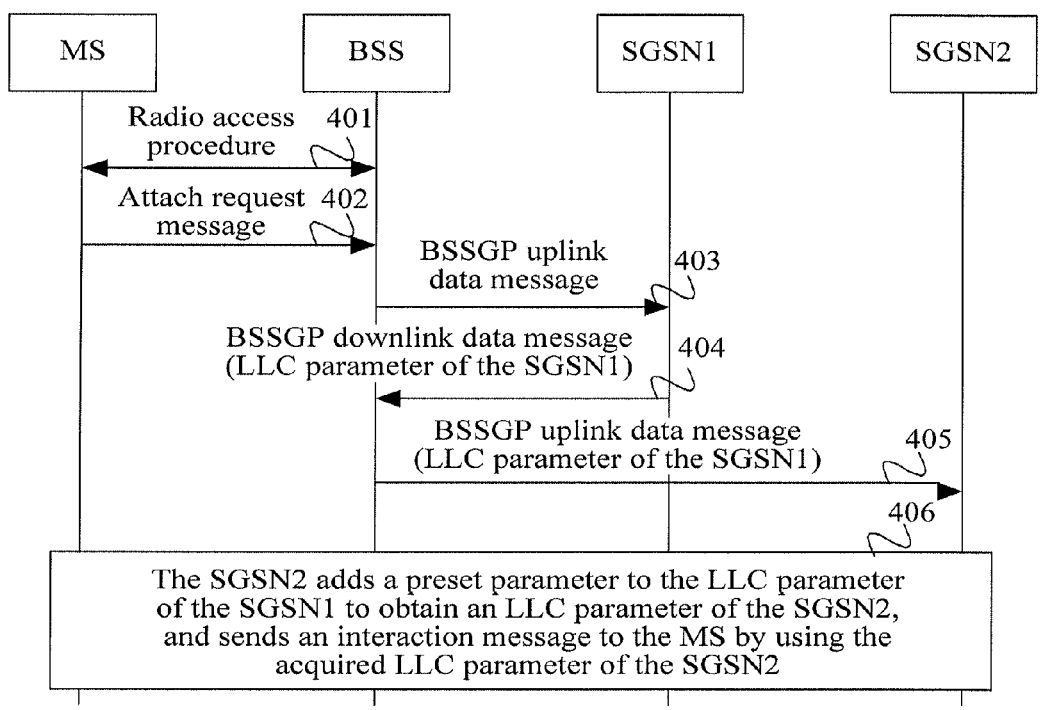
FIG. 4 is a schematic flow chart of another method for accessing a multi-operator core network according to a fourth embodiment of the present invention.

By taking an attach procedure as an example, FIG. 4 is a schematic flow chart of another method for accessing a multi-operator core network according to a fourth embodiment of the present invention. This embodiment is a specific embodiment of the foregoing embodiment. In this embodiment, a BSS is taken as an example of an access network device, and the BSS is interconnected with an SGSN1 of an operator 1 and an SGSN2 of an operator 2 separately. As shown in FIG. 4, the method for accessing a multi-operator core network according to this embodiment may include the following steps.

Step 401: An MS interacts with a BSS and performs a radio access procedure, and the BSS allocates a radio resource for the MS.

Step 402: The MS sends an attach request (Attach Request) message to the BSS.

Step 403: The BSS sends a base station subsystem GPRS protocol (Base Station Subsystem GPRS Protocol, BSSGP for short) uplink data (BSSGP UL-UNIDATA) message to an SGSN1, where the BSSGP uplink data message includes the attach request message and a redirection attempt flag (redirection attempt flag), and the redirection attempt flag may be used to indicate that the BSS supports MOCN.

Further, the BSS also needs to save information of the SGSN1 and record that the attach request message of the MS has already been sent to the SGSN1, so that the attach request message will not be sent to the SGSN1 again.

Step 404: The SGSN1 may acquire an international mobile subscriber identification number (International Mobile Subscriber Identification Number, IMSI for short) of the MS from the MS, or may also acquire the IMSI of the MS from an SGSN to which the MS was previously attached, acquire subscription data or configuration data of the MS (the configuration data includes, but is not limited to, a roaming protocol of an operator) according to the acquired IMSI of the MS, and judge that the MS cannot perform access or judge that the BSS needs to perform "CS/PS coordination", that is, determine to indicate redirection of the BSS, and send a BSSGP downlink data (BSSGP DL-UNIDATA) message to the BSS, where the BSSGP downlink data message includes an attach reject message (optional), the IMSI of the MS, the attach request message, a redirection indication (redirection indication), a reject cause (reject cause), and an LLC parameter of the SGSN1.

The reject cause is a cause value for indicating redirection of the BSS, that is, a reject cause of the redirection. The reject cause may be included in a redirection indication information element, or may be an independent information element. In this embodiment of the present invention, the BSSGP downlink data message that includes the redirection indication and/or the reject cause is also called a redirection message.

Specifically, when the SGSN determines to indicate the redirection of the BSS, the SGSN1 sends a redirection message that includes an LLC parameter to the BBS. The LLC parameter may be included in an LLC message packet of the redirection message (the LLC message packet may further include an attach reject message), and the BSS reads the LLC parameter from the LLC message packet. In another manner, an LLC information element may be included in a redirection indication information element of the redirection message, and therefore, the BSS is not required to read the LLC information element from an LLC message packet. Definitely, the LLC parameter is also included in another independent information element or message packet of the redirection message, which is not limited herein. For example, the SGSN1 rejects access of the MS according to the subscription data or configuration data; the SGSN1 constructs an attach reject message and encapsulates the attach reject message in an LLC message packet, and sets LLC parameter information in the LLC message packet; and the SGSN1 includes the LLC message packet in a BSSGP downlink data packet and sends the BSSGP downlink data packet to the BSS; and the BSS reads an LLC parameter in the LLC message packet. In another manner, the SGSN1 may write an LLC parameter in a corresponding field in a redirection indication information element, and include an LLC message packet that includes an attach reject message and the redirection indication information element in BSSGP downlink data (that is, a redirection message), and send the BSSGP downlink data to the BSS; in addition, the SGSN1 may further include the LLC parameter, directly as an independent information element, together with an LLC message packet that includes an attach reject message, in a BSSGP downlink data packet (that is, a redirection message), and send the BSSGP downlink data packet to the BSS, and the BSS reads an LLC information element parameter in the data packet.

Optionally, the redirection message may also not include the LLC parameter of the SGSN1. Specifically, when the SGSN1 determines to indicate the redirection of the BSS, when sending a redirection message to the BBS, the SGSN1 uses another message to transfer the LLC parameter, for example, defines a new message to transfer the LLC parameter of the SGSN1. A redirection message and a message that includes the LLC parameter may be sent in any order, which is not limited in this embodiment.

Specifically, the SGSN1 may also identify a reject cause. If it is identified that the reject cause is not CS/PS coordination (CS/PS coordination), the SGSN1 sends the LLC parameter to the BSS; and if it is identified that the reject cause is CS/PS coordination (CS/PS coordination), the SGSN1 does not send the LLC parameter to the BSS, and performs a relevant procedure in the prior art, which is not repeated herein.

Step 405: The BSS acquires a reject cause of the SGSN1 and sends a BSSGP uplink data (BSSGP UL-UNIDATA) message to an SGSN2 according to the redirection indication, where the BSSGP uplink data message includes the attach request message, the redirection attempt flag (redirection attempt flag), the IMSI of the MS, and an acquired LLC parameter of the SGSN1, and the redirection attempt flag may be used to indicate that the BSS supports MOCN.

The LLC parameter of the SGSN1 may be included in the redirection attempt flag, or may be an independent information element, which is not limited in this embodiment.

Specifically, the BSS may further identify the acquired reject cause that is returned by the SGSN1. If it is identified that the reject cause is not CS/PS coordination (CS/PS coordination), the BSS sends BSSGP uplink data that includes the LLC parameter to the SGSN2; and if it is identified that the reject cause is CS/PS coordination (CS/PS coordination), the BSS does not send the LLC parameter to the SGSN2, and performs a relevant procedure in the prior art, which is not repeated herein.

Step 406: The SGSN2 adds a preset parameter to the acquired LLC parameter of the SGSN1 to obtain an LLC parameter of the SGSN2, and sends an interaction message to the MS by using the obtained LLC parameter of the SGSN2.

Specifically, the SGSN2 may add a preset parameter increment (for example, 1) to the acquired LLC parameter of the SGSN1 to obtain the LLC parameter of the SGSN2. For example, the SGSN2 receives an N(U) of the SGSN1, where the N(U) of the SGSN1 is sent by the BSS, the SGSN2 adds a preset parameter, for example, 1, to the N(U), which serves as a N(U) value that is used for interaction between the SGSN2 and the MS, so as to prevent the N(U) from being used by the SGSN1, and the SGSN2 writes a used N(U) value in an N(U) field (field) shown in FIG. 9; or, the SGSN2 receives a V(U) of the SGSN1, where the V(U) of the SGSN1 is sent by the BSS, the SGSN2 adds a preset parameter, for example, 1, to the V(U), which serves as a N(U) that is used for interaction between the SGSN2 and the MS, so as to prevent the V(U) from being used by the SGSN1, and the SGSN2 writes a used V(U) value in the N(U) field (field) shown in FIG. 9. Detailed description is as follows:

A Acknowledgement request bit, acknowledgement request bit;

E Encryption function bit, encryption function bit;

Mn Unnumbered function bit, unnumbered function bit;

N(R) Transmitter receive sequence number, transmitter receive sequence number;

N(S) Transmitter send sequence number, transmitter send sequence number;

N(U) Transmitter unconfirmed sequence number, transmitter unconfirmed sequence number;

P/F Poll bit, when issued as a command, request bit;

Final bit, when issued as a response, final bit;

PM Protected mode bit, protected mode bit;

Sn Supervisory function bit, supervisory function bit; and

X Spare bit, spare bit.

In this step, after receiving the BSSGP uplink data message sent by the BSS, the SGSN2 acquires the LLC parameter of the SGSN1, where the LLC parameter of the SGSN1 is included in the BSSGP uplink data message, so that when exchanging a message with the MS, the SGSN2 can write the LLC parameter of the SGSN2 at a corresponding location in a message (for example, an authentication message), where the LLC parameter of the SGSN2 is obtained by adding a preset parameter to the acquired LLC parameter of the SGSN1, thereby preventing the MS from discarding the message. Moreover, because the LLC parameter used by the SGSN2 is transferred from the SGSN1, it can be ensured that a parameter that has been used by the SGSN1 is kept and is not used by the SGSN2 again. When the access network device selects, according to a rule, to forward to the MS a message that is sent by the SGSN1, the MS does not discard the message, thereby ensuring that the MS acquires and processes a network side message timely and performs network selection correctly.

In addition, in the prior art, if all SGSNs that are interconnected with the BSS reject the access request of the MS, at this time, the BSS selects, according to a rule, a reject cause that is sent by a certain SGSN to the MS. If an LLC parameter of a message that is sent by the selected SGSN has been used by another SGSN, the MS discards the message that is sent by the selected SGSN, so that the MS fails to receive a message from a network side all the time, thereby causing that the MS keeps trying to access a network but fails to acquire a network service, and seriously affecting user experience. By adopting the method according to this embodiment of the present invention, a problem in the prior art that an LLC parameter of a message that is sent by a selected SGSN has been used by another SGSN does not occur, and it can be avoided that the MS discards the message that is sent by the selected SGSN.

It should be noted that, for brevity, the foregoing method embodiments are described as a combination of a series of actions. Persons skilled in the art, however, should know that the present invention is not limited to the order of the described actions, because according to the present invention, some steps may be performed in other order or simultaneously. Next, persons skilled in the art should also know that the described embodiments in the specification are all exemplary embodiments, and the involved actions and modules are not necessarily required in the present invention.

In the foregoing embodiments, the description of each embodiment has its emphasis, and for a part that is not detailed in a certain embodiment, reference may be made to the relevant description of other embodiments.

Figure 5:
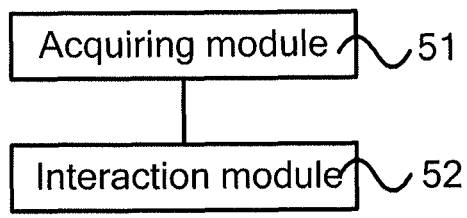
FIG. 5 is a schematic structural diagram of an apparatus for accessing a multi-operator core network according to a fifth embodiment of the present invention.

FIG. 5 is a schematic structural diagram of an apparatus for accessing a multi-operator core network according to a fifth embodiment of the present invention. As shown in FIG. 5, the apparatus for accessing a multi-operator core network according to this embodiment may include an acquiring module 51 and an interaction module 52. The acquiring module 51 acquires an LLC parameter of a first SGSN from an access network device, where the LLC parameter of the first SGSN is sent by the first SGSN to the access network device. The interaction module 52 interacts with an MS by using the LLC parameter of the first SGSN.

A function of the second SGSN in the first embodiment of the present invention and that of the SGSN2 in the second embodiment of the present invention both can be implemented by the apparatus for accessing a multi-operator core network provided in this embodiment.

Further, the interaction module 52 in this embodiment may be specifically configured to set a corresponding field of an LLC message packet as the LLC parameter of the first SGSN, where the LLC message packet is sent to the MS.

In this embodiment, the acquiring module acquires an LLC parameter of a first SGSN from an access network device, so that the interaction module can interact with an MS by using the LLC parameter of the first SGSN. In this way, a problem that an LLC parameter corresponding to a message that is sent by an SGSN to an MS is inconsistent with an expected LLC parameter of the MS so that the MS discards the message is avoided, thereby ensuring normal interaction between the MS and all SGSNs that are interconnected with an access network device. Moreover, because the LLC parameter that is used by the interaction module is transferred from the first SGSN, it can be ensured that a parameter that has been used by the first SGSN is kept and is not used by the interaction module again. When the access network device selects, according to a rule, to forward to the MS a message that is sent by the first SGSN, the MS does not discard the message, thereby ensuring that the MS acquires and processes a network side message timely and performs network selection correctly.

Figure 6:
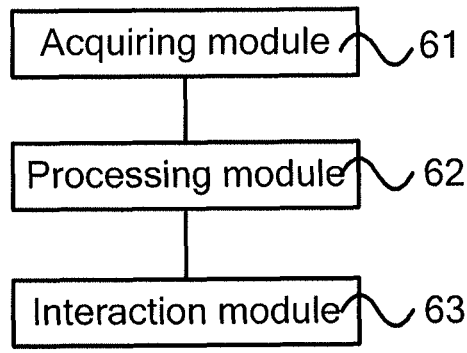
FIG. 6 is a schematic structural diagram of another apparatus for accessing a multi-operator core network according to a sixth embodiment of the present invention.

FIG. 6 is a schematic structural diagram of another apparatus for accessing a multi-operator core network according to a sixth embodiment of the present invention. As shown in FIG. 6, the apparatus for accessing a multi-operator core network according to this embodiment may include an acquiring module 61, a processing module 62, and an interaction module 63. The acquiring module 61 acquires an LLC parameter of a first SGSN from an access network device, where the LLC parameter of the first SGSN is sent by the first SGSN to the access network device. The processing module 62 adds a preset parameter to the LLC parameter of the first SGSN to obtain an LLC parameter of a second SGSN. The interaction module 62 interacts with an MS by using the LLC parameter of the second SGSN.

A function of the second SGSN in the third embodiment of the present invention and that of the SGSN2 in the fourth embodiment of the present invention both can be implemented by the apparatus for accessing a multi-operator core network provided in this embodiment.

Further, the interaction module 63 in this embodiment may be specifically configured to set a corresponding field of an LLC message packet as the LLC parameter of the second SGSN, where the LLC message packet is sent to the MS.

In this embodiment, the acquiring module acquires an LLC parameter of a first SGSN from an access network device, the processing module adds a preset parameter to the LLC parameter of the first SGSN to obtain an LLC parameter of a second SGSN, so that the interaction module can interact with an MS by using the LLC parameter of the second SGSN. In this way, a problem that an LLC parameter corresponding to a message that is sent by an SGSN to an MS is inconsistent with an expected LLC parameter of the MS so that the MS discards the message is avoided, thereby ensuring normal interaction between the MS and all SGSNs that are interconnected with an access network device. Moreover, because the LLC parameter that is used by the interaction module is transferred from the first SGSN, it can be ensured that a parameter that has been used by the first SGSN is kept and is not used by the interaction module again. When the access network device selects, according to a rule, to forward to the MS a message that is sent by the first SGSN, the MS does not discard the message, thereby ensuring that the MS acquires and processes a network side message timely and performs network selection correctly.

Figure 7:
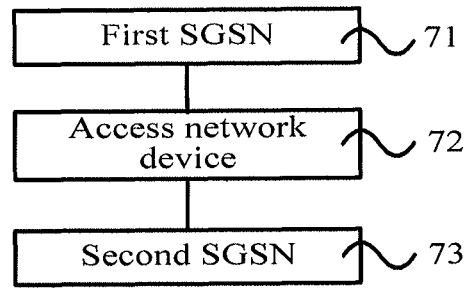
FIG. 7 is a schematic structural diagram of a system for accessing a multi-operator core network according to a seventh embodiment of the present invention.

FIG. 7 is a schematic structural diagram of a system for accessing a multi-operator core network according to a seventh embodiment of the present invention. As shown in FIG. 7, the system for accessing a multi-operator core network according to this embodiment may include a first SGSN 71, an access network device 72, and a second SGSN 73.

The first SGSN 71 is configured to send an LLC parameter of the first SGSN to the access network device 72.

The access network device 72 is configured to acquire the LLC parameter of the first SGSN from the first SGSN 71, and send the LLC parameter of the first SGSN to the second SGSN.

The second SGSN 73 is configured to acquire the LLC parameter of the first SGSN from the access network device 72, and interact with an MS by using the LLC parameter of the first SGSN.

A function of the first SGSN in the first embodiment of the present invention and that of the SGSN1 in the second embodiment of the present invention both can be implemented by the first SGSN 71 in the system for accessing a multi-operator core network provided in this embodiment. A function of the access network device in the first embodiment of the present invention and that of the BSS in the second embodiment of the present invention both can be implemented by the access network device 72 in the system for accessing a multi-operator core network provided in this embodiment. A function of the second SGSN in the first embodiment of the present invention and that of the SGSN2 in the second embodiment of the present invention both can be implemented by the second SGSN 73 in the system for accessing a multi-operator core network provided in this embodiment.

Further, the first SGSN 71 in this embodiment may be specifically configured to send a redirection message to the access network device 72, and send the LLC parameter to the access network device; or send a redirection message to the access network device 72, where the redirection message includes the LLC parameter of the first SGSN.

Further, the first SGSN 71 may further be configured to determine, according to subscription data or configuration data of the MS, to indicate redirection of the access network device.

Further, the second SGSN 73 in this embodiment may be specifically configured to acquire the LLC parameter of the first SGSN from the access network device 72, and set a corresponding field of an LLC message packet as the LLC parameter of the first SGSN, where the LLC message packet is sent to the MS.

Further, the first SGSN 71 may further be configured to use an LLC parameter that is used during interaction between the first SGSN 71 and the MS as the LLC parameter of the first SGSN, or use an LLC parameter to which a preset parameter is added as the LLC parameter of the first SGSN, where the LLC parameter is used during interaction between the first SGSN 71 and the MS.

In this embodiment, a second SGSN acquires an LLC parameter of a first SGSN from an access network device, so that the second SGSN can interact with an MS by using the LLC parameter of the first SGSN. In this way, a problem that an LLC parameter corresponding to a message that is sent by an SGSN to an MS is inconsistent with an expected LLC parameter of the MS so that the MS discards the message is avoided, thereby ensuring normal interaction between the MS and all SGSNs that are interconnected with an access network device. Moreover, because the LLC parameter used by the second SGSN is transferred from the first SGSN, it can be ensured that a parameter that has been used by the first SGSN is kept and is not used by the second SGSN again. When the access network device selects, according to a rule, to forward to the MS a message that is sent by the first SGSN, the MS does not discard the message, thereby ensuring that the MS acquires and processes a network side message timely and performs network selection correctly.

Figure 8:
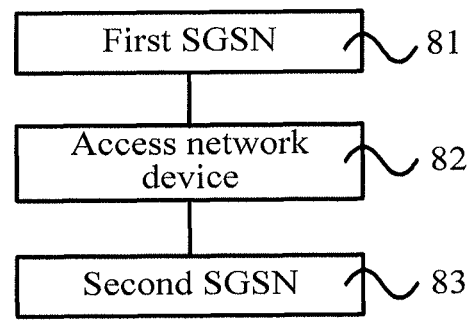
FIG. 8 is a schematic structural diagram of another system for accessing a multi-operator core network according to an eighth embodiment of the present invention.

FIG. 8 is a schematic structural diagram of another system for accessing a multi-operator core network according to an eighth embodiment of the present invention. As shown in FIG. 8, the system for accessing a multi-operator core network according to this embodiment may include a first SGSN 81, an access network device 82, and a second SGSN 83.

The first SGSN 81 is configured to send an LLC parameter of the first SGSN to the access network device 82.

The access network device 82 is configured to acquire the LLC parameter of the first SGSN from the first SGSN 81, and send the LLC parameter of the first SGSN to the second SGSN 83.

The second SGSN 83 is configured to acquire the LLC parameter of the first SGSN from the access network device 82, add a preset parameter to the LLC parameter of the first SGSN to obtain an LLC parameter of the second SGSN, and interact with an MS by using the LLC parameter of the second SGSN.

A function of the first SGSN in the third embodiment of the present invention and that of the SGSN1 in the fourth embodiment of the present invention both can be implemented by the first SGSN 81 in the system for accessing a multi-operator core network provided in this embodiment. A function of the access network device in the third embodiment of the present invention and that of the BSS in the fourth embodiment of the present invention both can be implemented by the access network device 82 in the system for accessing a multi-operator core network provided in this embodiment. A function of the second SGSN in the third embodiment of the present invention and that of the SGSN2 in the fourth embodiment of the present invention both can be implemented by the second SGSN 83 in the system for accessing a multi-operator core network provided in this embodiment.

Further, the first SGSN 81 in this embodiment may be specifically configured to send a redirection message to the access network device 82, and send the LLC parameter to the access network device; or send a redirection message to the access network device 82, where the redirection message includes the LLC parameter of the first SGSN.

Further, the first SGSN 81 may further be configured to determine, according to subscription data or configuration data of the MS, to indicate redirection of the access network device.

Further, the second SGSN 83 in this embodiment may be specifically configured to acquire the LLC parameter of the first SGSN from the access network device 82, add a preset parameter to the LLC parameter of the first SGSN to obtain the LLC parameter of the second SGSN, and set a corresponding field of an LLC message packet as the LLC parameter of the second SGSN, where the LLC message packet is sent to the MS.

Further, the first SGSN 81 may further be configured to use an LLC parameter that is used during interaction between the first SGSN 81 and the MS as the LLC parameter of the first SGSN.

In this embodiment, a second SGSN acquires an LLC parameter of a first SGSN from an access network device, and the second SGSN adds a preset parameter to the LLC parameter of the first SGSN to obtain an LLC parameter of the second SGSN, so that the second SGSN can interact with an MS by using the LLC parameter of the second SGSN. In this way, a problem that an LLC parameter corresponding to a message that is sent by an SGSN to an MS is inconsistent with an expected LLC parameter of the MS so that the MS discards the message is avoided, thereby ensuring normal interaction between the MS and all SGSNs that are interconnected with an access network device. Moreover, because the LLC parameter used by the second SGSN is transferred from the first SGSN, it can be ensured that a parameter that has been used by the first SGSN is kept and is not used by the second SGSN again. When the access network device selects, according to a rule, to forward to the MS a message that is sent by the first SGSN, the MS does not discard the message, thereby ensuring that the MS acquires and processes a network side message timely and performs network selection correctly.

Persons of ordinary skill in the art may understand that all or part of the steps of the method embodiments may be implemented by a program instructing relevant hardware. The program may be stored in a computer readable storage medium. When the program runs, the steps of the method embodiments are performed. The storage medium may be any medium capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features of the technical solutions, as long as these modifications or substitutions do not cause the essence of corresponding solutions to depart from the spirit and scope of the technical solutions in the embodiments of the present invention.

What is claimed is:

1. A method for accessing a multi-operator core network, comprising:

acquiring, by a second Serving GPRS Supporting Node (SGSN), a Logical Link Control (LLC) parameter of a first SGSN from an access network device, wherein the LLC parameter of the first SGSN is sent by the first SGSN to the access network device and is used during an interaction between the first SGSN and a mobile station (MS), and the LLC parameter comprises an unconfirmed send state variable (V(U)) used by LLC layer; and interacting, by the second SGSN, with the MS by using the LLC parameter of the first SGSN.

2. The method according to claim 1, wherein the LLC parameter is included in a redirection message from the first SGSN to the access network device.

3. The method according to claim 2, wherein the first SGSN determines to send the redirection message to the access network device upon the first SGSN's rejection of an attach request originating from the MS after consideration of subscription data or configuration data of the MS, the attach request being received by the first SGSN from the access network device.

4. The method according to claim 2, wherein the redirection message comprises at least one of a redirection indication and a reject cause.

5. The method according to claim 4, wherein the reject cause in the redirection message excludes CS/PS coordination.

6. The method according to claim 1, wherein the interacting, by the second SGSN, with the MS by using the LLC parameter of the first SGSN comprises:

setting, by the second SGSN, a corresponding field of an LLC message packet as the LLC parameter of the first SGSN; and sending, by the second SGSN, the LLC message packet to the MS.

7. The method according to claim 6, wherein the corresponding field of the LLC message packet is an V(U) field of the LLC message packet.

8. An apparatus for accessing a multi-operator core network, comprising:
    an receiver, configured to acquire a Logical Link Control (LLC) parameter of a first Serving GPRS Supporting Node (SGSN) from an access network device, wherein the LLC parameter of the first SGSN is sent by the first SGSN to the access network device, and wherein the LLC parameter of the first SGSN is used during an interaction between the first SGSN and a mobile station (MS), and the LLC parameter comprises an unconfirmed send state variable (V(U)) used by LLC layer; and
    an processer, configured to interact with the MS by using the LLC parameter of the first SGSN.

9. The apparatus according to claim 8, wherein the processer is configured to set a V(U) field of an LLC message packet as the LLC parameter of the first SGSN, wherein the LLC message packet is sent to the MS.

10. A system for accessing a multi-operator core network, comprising:
    a first SGSN configured to send an LLC parameter of the first Serving GPRS Supporting Node (SGSN) to an access network device, wherein the Logical Link Control (LLC) parameter of the first SGSN is used during an interaction between the first SGSN and a mobile station (MS), and the LLC parameter comprises an unconfirmed send state variable (V(U)) used by LLC layer;
    the access network device is configured to acquire the LLC parameter of the first SGSN from the first SGSN, and send the LLC parameter of the first SGSN to a second SGSN; and
    the second SGSN is configured to acquire the LLC parameter of the first SGSN from the access network device, and interact with the MS by using the LLC parameter of the first SGSN.

11. The system according to claim 10, wherein the first SGSN is specifically configured to:
    send a redirection message to the access network device, and send the LLC parameter of the first SGSN to the access network device; or
    send a redirection message to the access network device, wherein the redirection message comprises the LLC parameter of the first SGSN.

12. A method for accessing a multi-operator core network, comprising:
    receiving, by an access network device, from a first Serving GPRS Supporting Node (SGSN), a Logical Link Control (LLC) parameter, wherein the LLC parameter of the first SGSN is used during an interaction between the first SGSN and a mobile station (MS), and the LLC parameter comprises an unconfirmed send state variable (V(U)) used by LLC layer;
    sending, by the access network device, to a second SGSN, the LLC parameter of the first SGSN, wherein the LLC parameter of the first SGSN is used in an interaction between the second SGSN and the MS.

13. The method according to claim 12, wherein the receiving comprises:
    receiving, by the access network, from the first SGSN a redirection message, the redirection message including the LLC parameter.

14. The method according to claim 13, before the receiving from the first SGSN the redirection message, further comprising:
    receiving, by the access network device, an attach request from the MS;
    sending, by the access network device, the attach request to the first SGSN.

15. An access network device for accessing a multi-operator core network, comprising:
    a receiver configured to receive an LLC parameter from a first SGSN, wherein the LLC parameter of the first SGSN is used during an interaction between the first SGSN and a mobile station (MS), and the LLC parameter comprises an unconfirmed send state variable (V(U)) used by LLC layer;
    a transmitter configured to send, the LLC parameter of the first SGSN to a second SGSN, wherein the LLC parameter of the first SGSN is used in an interaction between the second SGSN and the MS.

16. The access network device according to claim 15, wherein the receiver further configured to receive a redirection message from the first SGSN, the redirection message including the LLC parameter.

17. The access network device according to claim 16, wherein the receiver further configured to receive an attach request from the MS; and
    the transmitter further configured to send the attach request to the first SGSN.

* * * * *

UNITED STATES PATENT AND TRADEMARK OFFICE
CERTIFICATE OF CORRECTION

PATENT NO. : 9,445,301 B2  
APPLICATION NO. : 13/896990  
DATED : September 13, 2016  
INVENTOR(S) : Yanping Zhang et al.

Page 1 of 1

It is certified that error appears in the above-identified patent and that said Letters Patent is hereby corrected as shown below:

On the Title Page

Left column, item (72), after "Wenfu Wu, Shanghai" replace "(DE)" with --(CN)--.

Signed and Sealed this  
Thirteenth Day of March, 2018

Andrei Iancu  
*Director of the United States Patent and Trademark Office*